United States Patent [19]

Tanaka et al.

[11] Patent Number: 5,039,787
[45] Date of Patent: Aug. 13, 1991

[54] METHOD FOR PRODUCTION OF CATIONIC WATER-SOLUBLE RESIN AND WATER-TREATING AGENT CONTAINING SAID RESIN BASED ON IMINE MODIFIED POLYETHYLENE GLYCOL HALOHYDRIN ETHERS

[75] Inventors: Yasumasa Tanaka, Osaka; Shigehiro Nishimura; Masatoshi Kurahashi, both of Hyogo; Yugi Sugiura, Osaka; Yoshinori Sano, Hyogo, all of Japan

[73] Assignee: Nippon Shokubai Kagaku Kogyo, Co., Ltd., Osaka, Japan

[21] Appl. No.: 318,065

[22] Filed: Feb. 21, 1989

[51] Int. Cl.$^5$ ............................................. C08G 65/32
[52] U.S. Cl. ...................... 528/405; 564/505; 528/407; 528/424; 525/403; 525/407; 525/409; 524/612; 162/164.3; 162/164.6; 523/405; 523/414; 523/417
[58] Field of Search ............... 564/505; 528/405, 407, 528/424; 525/403, 407, 409; 524/612; 162/164.3, 164.6; 523/404, 414, 417, 420

[56] References Cited

U.S. PATENT DOCUMENTS

| | | | |
|---|---|---|---|
| 3,129,133 | 4/1964 | Doyle et al. | 528/406 |
| 3,347,803 | 10/1967 | Frotscher et al. | 528/405 |
| 3,577,313 | 5/1971 | Bolger et al. | 528/405 |
| 3,635,842 | 1/1972 | Longoria et al. | 528/399 |
| 3,658,641 | 4/1972 | Shen | 528/424 |
| 3,746,678 | 7/1973 | Dick et al. | 528/405 |
| 3,753,931 | 8/1973 | Raspanti | 528/404 |
| 3,819,541 | 6/1974 | Longoria et al. | 528/405 |
| 3,890,172 | 6/1975 | Filter et al. | 528/399 |
| 3,915,904 | 10/1975 | Tonkyn et al. | 528/405 |
| 4,066,494 | 1/1978 | Scharf et al. | 162/164.3 |
| 4,128,511 | 12/1978 | Streit et al. | 525/523 |
| 4,224,421 | 9/1980 | Streit et al. | 528/424 |
| 4,673,729 | 6/1987 | Schroer et al. | 528/397 |
| 4,749,444 | 6/1988 | Lorz et al. | 162/183 |

FOREIGN PATENT DOCUMENTS

| | | |
|---|---|---|
| 24363865 | 2/1976 | Fed. Rep. of Germany . |
| 263895 | 2/1978 | Fed. Rep. of Germany . |
| 2638955 | 2/1978 | Fed. Rep. of Germany . |

Primary Examiner—Earl Nielsen
Assistant Examiner—Frederick Krass
Attorney, Agent, or Firm—Omri M. Behr

[57] ABSTRACT

Methods are disclosed for the production of (I) a cationic water-soluble resin by the reaction of a polyethylene glycol polyhalohydrin ether resulting from the reaction between polyethylene glycol and an epihalohydrin with an aziridine compound and (II) and (III) cationic water-soluble resins by the reaction of (I) the resin with an epihalohydrin and/or a polyfunctional epoxy compound in the presence or absence of a polyalkyleneimine. The resins (I), (II), and (III) are stable over a wide range of pH value and are useful as a water-treating agent.

62 Claims, 11 Drawing Sheets

METHOD FOR PRODUCTION OF CATIONIC WATER-SOLUBLE RESIN AND WATER-TREATING AGENT CONTAINING SAID RESIN BASED ON IMINE MODIFIED POLYETHYLENE GLYCOL HALOHYDRIN ETHERS

TECHINICAL FIELD

This invention relates to a method for the production of a cationic water-soluble resin and to a water-treating agent containing the resin. More particularly, it relates to a method for quickly and safely producing by a simple procedure a cationic water-soluble resin which is capable of being rendered soluble in a high concentration in water over a wide range of molecular weight and is useful not only as an agent for enhancing filtration of water and heightening yield of paper in the paper production but also as a flocculant and a dehydration accelerator and to a water-treating agent produced by the method of production mentioned above and enabled to manifest its effect in the uses over a wide range of pH value.

BACKGROUND ART

It has been well known that polyalkyleneimines are useful as an agent for enhancing filtration of water during the molding of paper sheet, an agent for heightening the yields of filtration, dye, pigment, very minute fibers, and as a flocculant for white water in the papermaking industry and as a flocculant and a dehydration-promoting agent for activated sludge in the treatment of plant effluent and sewage.

The polyalkyleneimines, however, do not easily admit of addition to molecular weight which constitutes itself one of the conditions essential for the uses mentioned above. Moreover, they are very expensive. When they are used as an agent for enhancing filtration of water and heightening yield in the papermaking operation, for example, they betray a disadvantage that they are effective only in the neutral range and do not produce any stable effect over a wide range of pH value.

As substances improved to eliminate the disadvantage, nitrogen-containing condenstaion products have been proposed as disclosed in the specification of DE 2,436,386. It is stated in this specification that when polyalkyleneimines are cross-linked with a polyalkylene glycol polychlorohydrin ether, there are obtained water-soluble nitrogen-containing condensation products which admit of addition to molecular weight, prove to be economic, and manifest their effect over a wide range of pH value.

Actually, however, the reaction of polyalkyleneimines with a polyethylene glycol polyhalohydrin ether proceeds slowly and the production of the condensate takes up much time. Further, the cross-linking reaction is neither controlled easily nor allowed to produce a condensate of a desired molecular weight. The condensation products consequently obtained, therefore, have a disadvantage that they are deficient in performance as a water-treating agent and they are barely obtained as an aqueous solution of a low concentration of resin. Moreover, the reaction has a disadvantage that it is required to be carried out at a uniform pH value to ensure stable production of the condensate and necessitates addition of an alkaline substance to the reaction system.

The water-soluble cross-linked nitrogen-containing condensation product obtained by the reaction of polyethylene glycol-polypropylene glycol polychlorohydrin with ethyleneimine has been also known in the art (specification of DE 2,638,955). This nitrogen-containing condensation product, however, possesses insufficient solubility, produces an aqueous solution of only low concentration of resin, and exhibits an insufficient performance as a water-treating agent.

This invention has originated in an urge to eliminate the problems suffered by the products of prior art and aimes to provide a method for quickly and safely producing by a simple procedure a cationic water-soluble resin transformable into an aqueous solution of high concentration over a wide ragne of molecular weight and a water-treating agent capable of manifesting a conspicuous effect thereof over a wide range of pH value.

DISCLOSURE OF INVENTION

The objects described above are accomplished by a method for the production of a cationic water-soluble resin, characterized by causing (A) 100 parts by weight of a polyethylene glycol polyhalohydrin ether obtained by the reaction of (a) 1 mol of polyethylene glycol with (b) 1 to 10 mols of an epihalohydrin to react with (B) 0.1 to 10,000 parts by weight of an aziridine compound.

The objects described above are further accomplished by a method for the production of a cationic water-soluble resin, characterized by causing (I) 100 parts by weight of a cationic water-soluble resin obtained by the reaction of (A) 100 parts by weight of a polyethylene glycol polyhalohydrin ether obtained by the reaction of (a) 1 mol of polyethylene glycol with (b) 1 to 10 mols of an epihalohydrin with (B) 0.1 to 10,000 parts by weight of an aziridine compound to react with 0.01 to 20 parts by weight of at least one member selected from the group consisting of (C) epihalohydrins and (D) water-soluble or water-dispersible polyfunctional epoxy compounds until the viscosity of an aqueous solution of a concentration of 20% by weight at 25° reaches a level in the range of 100 to 2,000 cps.

The objects described above are also accomplished by a cationic water-soluble resin, produced by causing (I) 100 parts by weight of a cationic water-soluble resin obtained by the reaction of (A) 100 parts by weight of a polyethylene glycol polyhalohydrin ether obtained by the reaction of (a) 1 mol of polyethylene glycol with (b) 1 to 10 mols of an epihalohydrin with (B) 0.1 to 10,000 parts by weight of an aziridine compound to react with 0.01 to 20 parts by weight of at least one member selected from the group consisting of (C) epihalohydrins and (D) water-soluble or water-dispersible polyfunctional epoxy compounds.

The objects described above still further accomplished by a method for the production of a cationic water-soluble resin, characterized by causing 100 parts by weight of a polycation component composed of (I) 99 to 1% by weight of a cationic water-soluble resin obtained by the reaction of (A) 100 parts by weight of a polyethylene glycol polyhalohydrin ether obtained by the reaction of (a) 1 mol of polyethylene glycol with (b) 1 to 10 mols of an epihalohydrin with (B) 0.1 to 10,000 parts by weight of an aziridine compound and (E) 1 to 99% by weight of a polyalkyleneimine to react with 0.01 to 20 parts by weight of (F) epihalohydrins and (G)

water-soluble or water-dispersible polyfunctional epoxy compounds until the viscosity of an aqueous solution of a concentration of 20% by weight at 25° C. reaches a level in the range of 100 to 2,000 cps.

Further, the objects described above are accomplished by a cationic water-soluble resin, produced by causing 100 parts by weight of a polycation component composed of (I) 99 to 1% by weight of a cationic water-soluble resin obtained by the reaction of (A) 100 parts by weight of a polyethylene glycol polyhalohydrin ether obtained by the reaction of (b) 1 mol of polyethylene glycol with (a) 1 to 10 mols of an epihalohydrin with (B) 0.1 to 10,000 parts by weight of an aziridine compound and (E) 1 to 99% by weight of a polyalkyleneimine to react with 0.01 to 20 parts by weight of at least one member selected from the group consisting of (F) epihalohydrins and (G) water-soluble or water-dispersible polyfunctional epoxy compounds.

The objects described above are also accomplished by a water-treating agent comprising at least one cationic resin selected from the group consisting of (I) a cationic water-soluble resin produced by the reaction of (A) 100 parts by weight of a polyethylene glycol polyhalohydrin other obtained by the reaction of (a) 1 mol of polyethylene glycol with (b) 1 to 10 mols of an epihalohydrin with (B) 0.1 to 10,000 parts by weight of an aziridine compound, (II) a cation type water-soluble resin produced by causing (I) said cationic water-soluble resin to react with 0.01 to 20 parts by weight of at least one member selected from the group consisting of (C) epihalohydrins and (D) water-soluble or water-dispersible polyfunctional epoxy compounds until the viscosity of an aqueous solution thereof a concentration of 20% by weight at 25° C. reaches a level in the range of 100 to 2,000 cps, and (III) a cationic water-soluble resin produced by causing 100 parts by weight of a polycation component composed of (I) 99 to 1% by weight of said cationic water-soluble resin and (E) 1 to 99% by weight of a polyalkyleneimine to react with 0.01 to 20 parts by weight of (F) an epihalohydrin and (G) a water-dispersible polyfunctional epoxy compound until the viscosity of an aqueous solution of a concentration of 20% by weight at 25° C. reaches a level in the range of 100 to 2,000 cps.

BEST MODE FOR CARRYING OUT THE INVENTION

Figure 2:
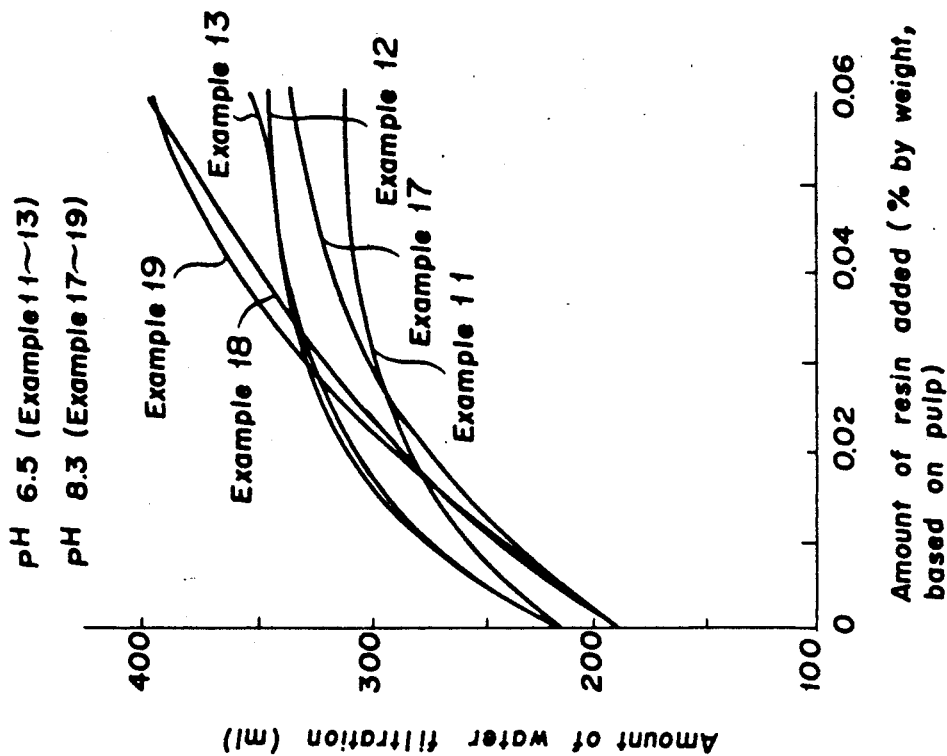
FIG. 2 is a graph showing the relation between the amount of a cationic water-soluble resin obtained by another method of this invention to be added to pulp and the amount water to be filtered.

The polyethylene glycol (a) to be used in the present invention is preferred to possess a molecular weight in the range of 200 to 100,000, more preferably 600 to 50,000, and the most preferably 1,000 to 20,000. If the molecular weight is less than 200, the cationic water-soluble resin in process of manufacture is liable to be gelled. Conversely, if the molecular weight exceeds 100,000, the reactivity of the polyethylene glycol (a) with epihalohydrin is too low to produce a cationic water-soluble resin which meets the object of this invention.

As typical examples of the epihalohydrin (b) to be used in the present invention, epichlorohydrin and epibromohydrin may be cited. In terms of the ease of commercial availability, it is desirable to use epichlorohydrin.

In the method of production according to this invention, use of the polyethylene glycol (a) is essential for the synthesis of a polyethylene glycol polyhalohydrin ether (A). If other polyalkylene glycol such as, for example, polypropylene glycol or an ethylene glycol-propylene glycol copolymer is substituted for the polyethylene glycol (a), the produced resin possesses insufficient solubility in water and, though the solubility in water is manifested at all, permits formation of an aqueous solution of high viscosity and brings about a notably poor effect as a water-treating agent. Thus, this substitution proves to be undesirable.

The aziridine (B) to be used in the present invention is not specifically restricted except for the requirement that it should possess one aziridine group in the molecular unit thereof. For example, aziridine compounds having a substituent in the aziridine ring thereof may be used either singly or jointly in the form of a mixture of two or more members.

As typical examples of the aziridine compound of this description, ethyleneimine, propyleneimine, butyleneimine, N-hydroxyethylethyleneimine, N-cyanoethylethyleneimine, N-methylethyleneimine, N-ethylethyleneimine, N-phenylethyleneimine, N-acetylethyleneimine, N-methacryloyl aziridine, beta-aziridinylmethyl propionate, and beta-aziridinylethyl methacrylate may be cited.

Although the various compounds cited above are usable as the aziridine compound (B) in the present invention, it is desirable to use an alkyleneimine, specifically ethyleneimine, is used preferably from the standpoint of economic advantage, reactivity of the aziridine compound with polyethylene glycol-polyhalohydrin ether (A), stable water solubility of the produced cationic water-soluble resin, and performance of the resin as a water-treating agent.

The production of the polyethylene glycol polyhalohydrin ether (A) from the polyethylene glycol (a) and the epihalohydrin (b) is accomplished by simply causing the polyethylene glycol (a) admixed with a Brönsted acid or a Lewis acid as a catalyst to react with the epihalohydrin (b) at a temperature in the range of 30° to 150° C., preferably 50° to 100° C. The Lewis acids and Brönsted acids usable for this reaction include sulfuric acid, paratoluenesulfonic acid, perchloric acid, aluminum chloride, and boron fluoride ether complex, for example. Among other acids mentioned above, the boron fluoride ether complex proves to be particularly desirable. The amount of this acid catalyst to be used in the reaction is in the range of 0.01 to 1% by weight, preferably 0.02 to 0.5% by weight, based on the amount of the polyethylene glycol (a). The ratio of the polyethylene glycol (a) to epihalohydrin (b) is desired to be such that the amount of the epihalohydrin (b) falls in the range of 1 to 10 mols, preferably 2 to 5 mols, per mol of the polyethyelne glycol (a). If the amount of the epihalohydrin (b) is less than 1 mol, part of the polyethylene glycol (a) is suffered to remain in its unaltered form in the reaction product and the cationic water-soluble resin to be obtained at all does not meet the object of this invention and exhibits an insufficient performance as a water-treating agent. Conversely, if this amount exceeds 10 mols, there arises an inconvenience that the cationic water-soluble resin in process of manufacture is liable to be gelled.

The first mode of the method of this invention for the production of the cationic water-soluble resin comprises adding to the polyethylene glycol polyhalohydrin ether (A) prepared by the procedure described above or an aqueous solution thereof the aziridine compound (B) thereby effecting a ring-opening addition polymerization reaction. In this case, the weight ratio of the polyethylene glycol polyhalohydrin ether (A) to the aziridine compound (B) is selected in the range of 100/0.1–10,000, more preferably 100/1–500, and the most pereferably 100/10–250. If the proportion of the aziridine compound is less than 0.1, the produced resin exhibits an insufficient performance as a water-treating agent. Conversely, if this proportion exceeds 10,000, the reaction proves to be undesirable economically. The reaction is preferred to be carried out in an aqueous solution adapted to contain the produced cationic water-soluble resin in the final concentration in the range of 5 to 100% by weight, preferbly 20 to 70% by weight, at a temperature generally for inducing the ring-opening polymerization reaction of the aziridine compound such as, for example, a temperature in the range of 0° to 200° C., preferably 50° to 100° C. If the aqueous solution having the final resin concentration of less than 5% by weight, the reaction proceeds slowly and the product of this reaction exhibits an insufficient performance as a water-treating agent. The reaction velocity is unduly low when the reaction temperature is less than 0° C. The control of the reaction is difficult when the reaction temperature exceeds 200° C.

The cationic water-soluble resin (I) to be obtained by this method permits control of molecular weight in a wide range such as from 1,000 to 2,000,000, preferably 5,000 to 1,000,000. Moreover, the aqueous solution of the produced cationic water-soluble resin (I) has a low viscosity. When this cationic water-soluble resin (I) is so produced as to meet the object of this invention, the product is useful as a flocculant and is capable of manifesting its effect over a wide range of pH value.

The second mode of the method of this invention for the production of . the cationic water-soluble resin comprises causing 100 parts by weight of the cationic water-soluble resin (I) obtained by the procedure described above to react with 0.01 to 20 parts by weight of at least one member selected from the group consisting of epihalohydrin (C) and water-soluble or water-dispersible polyfunctional epoxy compounds (D) until the viscosity of the aqueous solution of a resin concentration of 20% by weight at 25° C. reaches a level in the range of 100 to 2,000 cps.

The typical examples of the epichlohydrin (C) usable for this reaction are the same as those of the aforementioned epihalohydrin (b). From the standpoint of ease of commercial availability, epichlorohydrin proves to be particularly preferable.

The water-soluble or water-dispersible polyfunctional epoxy compound (D) has no specific restriction except for the requirement that it should possess at least two epoxy groups in the molecular unit thereof and shouldbe soluble or dispersible in water. The water-soluble polyfunctional epoxy compounds such as polyethylene glycol diglycidyl ether, polypropylene glycol diglycidyl ether, glycerol polyglycidyl ether, trimethylolpropane polyglycidyl ether, diglycerol polyglycidylether, polyglycerol polyglycidyl ether, and sorbitol polyglycidyl ether and the water-dispersible polyfunctional epoxy compounds such as bisphenolic epoxy resin may be cited as examples. Among other epoxy compounds mentioned above, a polyethylene glycol diglycidyl ether represented by the following formula (1) is used advantageoulsy because this compound is soluble in water in itself and, therefore, is easy to handle, and is capable of reacting with the cationic water-soluble resin (I) quickly at a low temperature and consequently producing a cationic water-soluble resin which permits easy control of molecular weight, possesses a high molecular weight, and forms an aqueous solution of low viscosity:

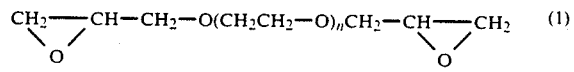

wherein n is an integer of 1 to 30.

The amount of the epihalohydrin (C) and/or the water-soluble or water-dispersible polyfunctional epoxy compound (D) to be used in the reaction mentioned above is in the range mentioned above, based on 100 parts by weight of the cationic water-soluble resin (I). If this amount is less than 0.01 part by weight, the product does not manifest the effect aimed at. Conversely, if this amount exceeds 20 parts by weight, the reaction entails gelation. The amount, therefore, is desired to fall in the range of 0.1 to 10 parts by weight. To manifest the effect of a water-treating agent fully effectively, the water-soluble or water-dispersible polyfunctional epoxy compound (D) is preferred to be used singly in an amount in the range of 0.1 to 10 parts by weight.

The reaction is carried out until the viscosity of the aqueous solution of 20% by weight of the cationic water-soluble resin at 25° C. reaches a level in the range of 100 to 2,000 cps. If the viscosity is less than 100 cps, the product does not manifest a sufficient effect as a water-treating agent. Conversely, if the viscosity exceeds 2,000 cps, the product does not acquire any addition to its effect as a water-treating agent but entails loss of time and loss of economy.

For the reaction to proceed smoothly, the cationic water-soluble resin (I) is preferred to be prepared in the form of an aqueous solution of a resin concentration in the range of 10 to 30% by weight, preferably 15 to 25% by weight, admixed with the epihalohydrin (C) and/or the water-soluble or water-dispersible polyfunctional epoxy compound (D), and heated for reaction at a temperature in the range of 0° to 80° C., preferably 20° to 60° C.

The cationic water-soluble resin (II) to be obtained by this method possesses a molecular weight in the range of 50,000 to 2,000,000, preferably 100,000 to 1,000,000, for example. It manifests a higher effect as a water-treating agent than the cationic type water-soluble resin (I) over a wide range of pH value.

The third mode of the method of this invention for the production of the cationic water-soluble resin comprises causing 100 parts by weight of a polycation component composed of 99 to 1% by weight of the cationic water-soluble resin (II) obtained by the procedure described above and 1 to 99% by weight of the polyalkyleneimine (E) to react with 0.01 to 20 parts by weight, preferably 0.1 to 10 parts by weight, of the epihalohydrin (F) and/or the water-soluble or water-dispersible polyfunctional epoxy compound (G) until the viscosity of the aqueous solution of a resin concentration of 20% by weight at 25° C. reaches a level in the range of 100 to 2,000 cps.

In this case, the reason for using the epichlorohydrin (F) and/or the water-soluble or water-dispersible polyfunctional epoxy compound (G) in an amount in the range mentioned above and the reason for continuing the reaction until the viscosity of the aqueous solution of the resin concentration of 20% by weight at 25° C. reaches a level in the aforementioned range are the same as those given above with respect to the cationic water-soluble resin (II).

In this reaction, the polyalkyleneimine (E) is a component intended to heighten the effect of the produced cationic water-soluble resin in the alkaline region while maintaining the effect of the water-treating agent in a wide range of pH value and is used in the aforementioned range, preferably in the range of 5 to 70% by weight, based on the amount of the polycation component. If the amount of the polyalkyleneimine (E) to be used is less than 1% by weight based on the amount of the polyalkyleneimine (E), the effect due to the use of this polyalkyleneimine (E) is not observed at all and this use of the compound only entails an addition to cost. Conversely, if this amount exceeds 99% by weight, the cationic water-soluble resin capable of manifesting the effect of a water-treating agent over a wide range of pH value cannot be obtained. As typical example of the polyalkyleneimine (E), polyethyleneimine, polypropyleneimine, and polybutyleneimine may be cited. For the production of a water-treating agent of outstanding performance in accordance with the present invention, it is particularly preferable to use polyethyleneimine. Advantageously, the polyethyleneimine is preferred to possess an average molecular weight exceeding 1,000, preferably falling in the range of 2,000 to 100,000. For the same reason as given above with respect to the method for the production of the cationic water-soluble resin (II), the polycation component is preferred to be prepared in the form of an aqueous solution of a resin concentration in the range of 10 to 30% by weight, preferably 15 to 25% by weight, admixed with the epihalohydrin (F) and/or the water-soluble or water-dispersible polyfunctional epoxy compound (G), and heated for reaction at a temperature in the range of 0° to 80° C., preferably 20° to 60° C.

The cationic water-soluble water-treating agent (III) obtained as described above possesses a molecular weight in the range of 50,000 to 2,000,000, preferably 100,000 to 1,000,000, for example, and manifests an enhanced effect in the alkaline region while retaining the effect of a water-treating agent over a wide range of pH value.

In the second and third modes of the method of production of this invention, the cationic water-soluble resin (I) can be used as the raw material and can be freely adjusted to a desired molecular weight. Even when the cationic water-soluble resin (I) is obtained in a low molecular weight so as to be prepared as an aqueous solution of high concentration, the second and third modes of the method permit production of the cationic water-soluble resins (II) and (III) exhibiting notably enhanced performance as water-treating agents.

The water-treating agent of the present invention is a production containing at least one cationic resin selected form among the cationic water-soluble resin (I), the cationic water-soluble resin (II), and the cationic water-soluble resin (III) obtained by the modes of method described above. The water-treating resin of this invention manifests a highly satisfactory water-treating effect over a wide range of pH value. Especially, the water-treating agent essentially using at least either of the cationic water-soluble resin (II) and the cationic water-soluble resin (III) exhibits a notably enhanced water-treating effect over a wide range of pH value. Further, the water-treating agent which essentially uses the cationic water-soluble resin (III) manifests a still higher water-treating effect in the alkaline region while retaining its high water-treating effect over a wide range of pH value.

The water-treating agent of this invention is particularly useful as an agent for enhancing the filtration of water during the molding of paper sheet, an agent for improving the yields of filler, dye, pigment, and minute fibers of pulp, and a flocculant for white water in the papermaking industry, as a flocculant for activated sludge in the treatment of plant effluent and sewage, and as an agent for promoting dehydration.

Now, the present invention will be described specifically below with reference to working examples. It should be noted, however, that this invention is not restricted in any way by these examples.

Example 1

In a flask provided with a dropping funnel, a stirrer, a thermomter, and reflux condenser, 1,000 g of polyethylene glycol possessing a molecular weight of 1,800 was placed and heated to 65° C. The hot polyethylene glycol, 2.1 g of boron trifluoride etherate added thereto as a catalyst, and 113.1 g of epichlorohydrin added dropwise thereto over a period of 20 minutes were left reacting for 4.5 hours, to obtain polyethylene glycol polychlorohydrin ether.

A solution of 160 g of the polyethylene glycol polychlorohydrin ether diluted with 1,600 g of deionized water was heated to 80° C. The hot diluted solution and 240 g of ethylene imine added thereto dropwise over a period of 45 minutes were left reacting for 6 hours. The reaction was completed when the residual ethyleneimine content was found to be less than 1 ppm as determined by gas chromatography and the viscosity of the resin was confirmed to have reached a fixed level. Consequently, a cationic water-soluble resin (I) in accordance with this invention was obtained.

The aqueous solution thus obtained had a resin concentration of 20% by weight and a viscosity (B type) of 360 cps at 25° C. By the analysis of the aqueous solution for chlorine ion by ion chromatography, the conversion of polyethylene glycol polychlorohydrin ether was found to be 95.2%.

Examples 2 to 7

Cationic resins (2) to (7) were obtained by following the procedure of Example 1, except that the kind of raw material, the amount of raw material, and the conditions of reaction were varied as indicated in Table 1. The behaviors of the produced aqueous solutions of resin were as shown in Table 1.

When 200 g of an aqueous solution of 30% by weight of polyethyleneimine possessing a molecular weight of 1,200 was placed in a flask and heated to 80° C. and then the resultant hot solution and 200 g of an aqueous solu-

TABLE 1

|  | | Example | | | | | |
| --- | --- | --- | --- | --- | --- | --- | --- |
| | | 2 | 3 | 4 | 5 | 6 | 7 |
| Cationic water-soluble resin | | (2) | (3) | (4) | (5) | (6) | (7) |
| Synthesis of polyethylene glycol polychlorohydrin ether | | | | | | | |
| Molecular weight of polyethylene glycol used | | 1,800 | 1,000 | 3,800 | 7,500 | 7,500 | 12,980 |
| Ratio of polyethylene glycol/epichlorohydrin used (molar ratio) | | 1/2.2 | 1/1.6 | 1/2.2 | 1/2.2 | 1/2.2 | 1/3.0 |
| Catalyst | | | | Boron fluoride ether complex | | | |
| Ratio of catalyst/epichlorohydrin used (molar ratio) | | 1/83 | 1/115 | 1/20 | 1/20 | 1/20 | 1/10 |
| Reaction time (hr) | | 4.5 | 3 | 2 | 5 | 3 | 3 |
| Reaction temperature (°C.) | | 65 | 65 | 80 | 75 | 75 | 80 |
| Synthesis of cationic water-soluble resin | | | | | | | |
| Ratio of polyalkylene glycol polychlorohydrin ether/ethyleneimine used (weight ratio) | | 40/60 | 40/60 | 50/50 | 50/50 | 70/30 | 50/50 |
| Final concentration (% by eight) | | 40 | 20 | 30 | 50 | 40 | 60 |
| Reaction time (hr) | | 6 | 8 | 6 | 6.5 | 4 | 5 |
| Reaction temperature (°C.) | | 80 | 70 | 80 | 80 | 80 | 90 |
| Viscosity of aqueous solution (B type) (cps) [25° C.] | Resin solution obtained | 16,700 | 480 | 680 | 9,380 | 2,060 | 18,100 |
| | 20% aqueous solution | 700 | 480 | 202 | 63 | 128 | 69 |
| Conversion of polyalkylene glycol polychlorohydrin ether (%) | | 94.3 | 94.1 | 98.9 | 90.0 | 98.2 | 90.5 |

Control 1

A water-soluble resin (1) for comparison was obtained by placing 300 g of an aqueous solution of 20% by weight of polyethyleneimine possessing a molecular weight of 1,800 in a flask, heating the aqueous solution to 80° C., and allowing the hot aqueous solution and 200 g of an aqueous solution of 20% by weight of polyethylene glycol polychlorohydrin ether obtained by repeating the procedure of Example 1 and added thereto dropwise over a period of 5 hours to reat with each other for 6 hours, with the pH value of the reaction system kept above 9.5 with an aqueous solution of 50% sodium hydroxide. The aqueous solution of resin thus obtained had a concentration of 20% by weight and a viscosity of 46.5 cps at 25° C. By the analysis of this aqueous solution for chlorine ion by ion chromatography, the conversion of polyethylene glycol polychlorohydrin ether was found to be 52.3%.

Control 2

A polyethylene glycol polychlorohydrin ether was obtained by repeating the procedure of Example 2.

When 300 g of an aqueous solution of 40% by weight of polyethyleneimine possessing a molecular weight of 1,800 was placed in a flask and heated to 80° C. and then the resultant hot solution and 200 g of an aqueous solution of 40% by weight of the aforementioned polyethylene glycol polychlorohydrin ether added dropwise thereto over a period of 5 hours were allowed to react with each other, with the pH value of the reaction system kept above 9.5 with an aqueous solution of 50% by weight of sodium hydroxide. The reaction system was gelled before the reaction was completed.

Control 3

A polyethylene glycol polychlorohydrin ether was obtained by repeating the procedure of Example 4.

tion of 30% by weight of the aforementioned polyethylene glycol polychlorohydrin ether added dropwise thereto over a period of 5 hours were allowed to react with each other, with the pH value of the reaction system kept above 9.5 with an aqueous solution of 50% by weight of sodium hydroxide to obtain a water-soluble resin (3) for comparison. The aqueous solution of resin thus obtained had a concentration of 30% by weight and a viscosity of 790 cps at 25° C. When this aqueous solution was adjusted to 20% by weight, viscosity thereof was 210 cps. By the analysis of this aqueous solution for chlorine ion by ion chromatography, the conversion of polyethylene glycol polychlorohydrin ether was found to be 76.9%.

Control 4

A water-soluble resin (4) for comparison was obtained by repeating the procedure of Example 5, except that an ethylene glycol-propylene glycol block copolymer(having a molecular weight of 7,500) obtained by copolymerizing ethylene glycol and propylene glycol at a weight ratio of 80/20 was used in place of polyethylene glycol. The aqueous solution of resin thus obtained had a concentration of 50% by weight and a viscosity of 13,640 cps at 25° C. When this acqueous solution was adjusted to 20% by weight, the viscosity thereof was 120 cps. By the analysis of this aqueous solution for chlorine ion by ion chromatography, the conversion of the polyalkylene glycol polychlorohydrin ether was found to be 82.2%.

Controls 5 to 9

Water-soluble resins (5) to (9) for comparison were obtained by repeating the procedure of Example 1, except that the kind of raw material, the amount of raw material used, and the conditions of reaction were varied as indicated in Table 2. The behaviors of these aqueous solutions of resin were as shown in Table 2.

TABLE 2

| | Control | | | | |
| --- | --- | --- | --- | --- | --- |
| | 5 | 6 | 7 | 8 | 9 |
| Water-soluble resin for comparison | (5) | (6) | (7) | (8) | (9) |
| Synthesis of polyethylene glycol polychlorohydrin ether | | | | | |
| Molecular weight of polyethylene glycol used | 3,800 | 3,800 | 7,500 | 180 | 200,000 |

TABLE 2-continued

|  |  | Control | | | | |
|---|---|---|---|---|---|---|
|  |  | 5 | 6 | 7 | 8 | 9 |
| Ratio of polyethylene glycol/epichlorohydrin used (molar ratio) | | 1/0.9 | 1/10 | 1/2.2 | 1/2.2 | 1/2.2 |
| Catalyst | | Boron fluoride ether complex | | | | |
| Ratio of catalyst/epichlorohydrin used (molar ratio) | | 1/10 | 1/100 | 1/20 | 1/830 | 1/5 |
| Reaction time (hr) | | 3 | 3 | 5 | 4 | 5 |
| Reaction temperature (°C.) | | 75 | 75 | 75 | 65 | 80 |
| Synthesis of cationic water-soluble resin | | | | | | |
| Ratio of polyalkylene glycol polychlorohydrin ether/ethyleneimine used (weight ratio) | | 50/50 | 50/50 | 99.1/0.1 | 40/60 | 40/60 |
| Final concentration (% by eight) | | 30 | 30 | 40 | 40 | 40 |
| Reaction time (hr) | | 4 | — | 6 | — | 8 |
| Reaction temperature (°C.) | | 80 | 80 | 80 | 70 | 90 |
| Viscosity of aqueous solution (B type) | Resin solution obtained | 140 | Gelation during reaction | 104 | Gelation during reaction | 578 |
| (cps) [25° C.] | 20% aqueous solution | 36 | | 24 | | 32 |

Example 8

A cationic water-soluble resin (8) in accordance with this invention was obtained by diluting 200 g of the cationic water-soluble resin obtained in Example 5 to a concentration of 20% by weight with 300 g of deionized water, admixing the diluted aqueous solution with 1.3 g of ethylene glycol diglycidyl ether (satisfying the formula (1) by having 1 for n) (1.3% by weight based on solids content of resin) while in a stirred state, and thereafter allowing the resultant mixture to stand at 25° C. for 6 hours. The final viscosity of the water-soluble resin at 25° C. was 385 cps.

Examples 9 to 13

Cationic water-soluble resins (9) to (13) were obtained by repeating the procedure of Example 8, except that the kinds of raw material, the amounts of raw material used, and the conditions of reaction were varied as indicated in Table 3. The behaviors of the aqueous solutions of resin were as shown in Table 3.

TABLE 3

|  |  | Example | | | | |
|---|---|---|---|---|---|---|
|  |  | 9 | 10 | 11 | 12 | 13 |
| Cationic water-soluble resin | | (9) | (10) | (11) | (12) | (13) |
| Cationic water-soluble resin used as raw material | | (5) | (5) | (6) | (6) | (6) |
| Epihalohydrin (C) and/or water-soluble or water-dispersible polyfunctional epoxy compound (B) | Type | Ethylene glycol diglycidyl ether (n = 1)/epichlorohydrin | Epichlorohydrin | Polyethylene glycol diglycidyl ether (n = 22) | | |
| Amount of cross-linking agent (% by weight based on solids content of resin) | | 0.5/1.4 | 3.3 | 0.01 | 7.2 | 11.0 |
| Reaction temperature (°C.) | | 60 | 60 | 25 | 25 | 25 |
| Reaction time (hr) | | 2 | 3 | 6 | 6 | 6 |
| Viscosity (B type) (cps) [25° C.] | | 420 | 400 | 130 | 310 | 1,750 |

Control 10

When 100 g of the cationic water-soluble resin obtained in Example 6 was diluted to a concentration of 20% by weight with 100 g of deionized water, admixed with 12.5 g of polyethylene glycol polyglycidyl ether (n =22) (25% by weight based on solids content of resin) as stirred, and then left standing for 6 hours, there was obtained a gelled substance having no fluidity. This produce was not soluble in water.

Example 14

A cationic water-soluble resin (14) in accordance with this invention was obtained by diluting 94 g of the cationic water-soluble resin obtaied in Example 5 with 146 g of deionized water, uniformly admixing the diluted solution with 10 g of an aqueous solution of 30% by weight of polyethyleneimine possessing a molecular weight of 70,000 while in a stirred state, thoroughly stirring the resulant mixture with 0.65 g of ethylene glycol diglycidyl ether (1.3% by weight based on solids content of resin), and allowing the resulant mixture to stand for 6 hours. The final viscosity of the resin was 425 cps at 25° C.

Examples 15 to 19

Cationic water-soluble resins (15) to (19) were obtained by repeating the procedure of Example 14, except that the kinds of raw material, the amounts of raw material used, and the conditions of reaction were varied as indicated in Table 4. The behaviors of these aqueous solution of resin were as shown in Table 4.

TABLE 4

|  |  | Example | | | | |
|---|---|---|---|---|---|---|
|  |  | 15 | 16 | 17 | 18 | 19 |
| Cationic water-soluble resin used | | (5) | (5) | (6) | (6) | (6) |
| Molecular weight of polyethyleneimine | | 70,000 | 70,000 | 20,000 | 20,000 | 20,000 |
| Resin/polyethyleneimine (weight ratio) | | 94/6 | 94/6 | 86/14 | 86/14 | 86/14 |
| Epihalohydrin (F) and/or water-soluble or water-dispersible Polyfunctional epoxy compound (B) | Type | Ethylene glycol diglycidyl ether (n = 1)/epichloro- | Epichlorohydrin | Polyethylene glycol diglycidyl ether | | |

TABLE 4-continued

| | Example | | | | |
|---|---|---|---|---|---|
| | 15 | 16 | 17 | 18 | 19 |
| | hydrin | | | | |
| Amount of cross-linking agent (% by weight based on solids content of resin) | 0.5/1.4 | 3.3 | 0.01 | 7.2 | 11.0 |
| Reaction temperature (°C.) | 60 | 60 | 25 | 25 | 25 |
| Reaction time (hr) | 2 | 3 | 6 | 6 | 6 |
| Viscosity (B type) (cps) [25°C.] | 460 | 450 | 170 | 350 | 1,930 |

Control 11

A water-soluble resin (11) for comparison was obtained by repeating the procedure of Example 18, except that a polycation component composed of 99.5% by weight of the cationic water-soluble resin (6) and 0.5% by weight of polyethyleneimine was used in place of the polycation component composed of 86% by weight of the cationic water-soluble resin (6) and 14% by weight of polyethyleneimine. The final viscosity of this resin was 305 cps at 25° C.

Control 12

A water-soluble resin (12) for comparison was obtained by repeating the procedure of Example 18, except that a polycation component composed of 0.5% by weight of the cationic water-soluble resin (6) and 99.5% by weight of polyethyleneimine was used in place of the polycation component composed of 86% by weight of the cationic water-soluble resin (6) and 14% by weight of polyethyleneimine. The final viscosity of this resin was 720 cps at 25° C.

Control 13

When 107.5 g of the cationic water-soluble resin (6) obtained in Example 6 was diluted to a concentration of 20% by weight with 107.5 g of deionized water, uniformly admixed as stirred with 35 g of an aqueous solution of 20% by weight of polyethyleneimine possessing a molecular weight of 20,000, then thoroughly stirred with 12.5 g of polyethylene glycol polyglycidyl ether (n=22) (25% by weight based on solids content of resin), and then left standing for 6 hours, a gelled substance having no fludity was obtained. This product was not soluble in water.

Example 20

Figure 1:
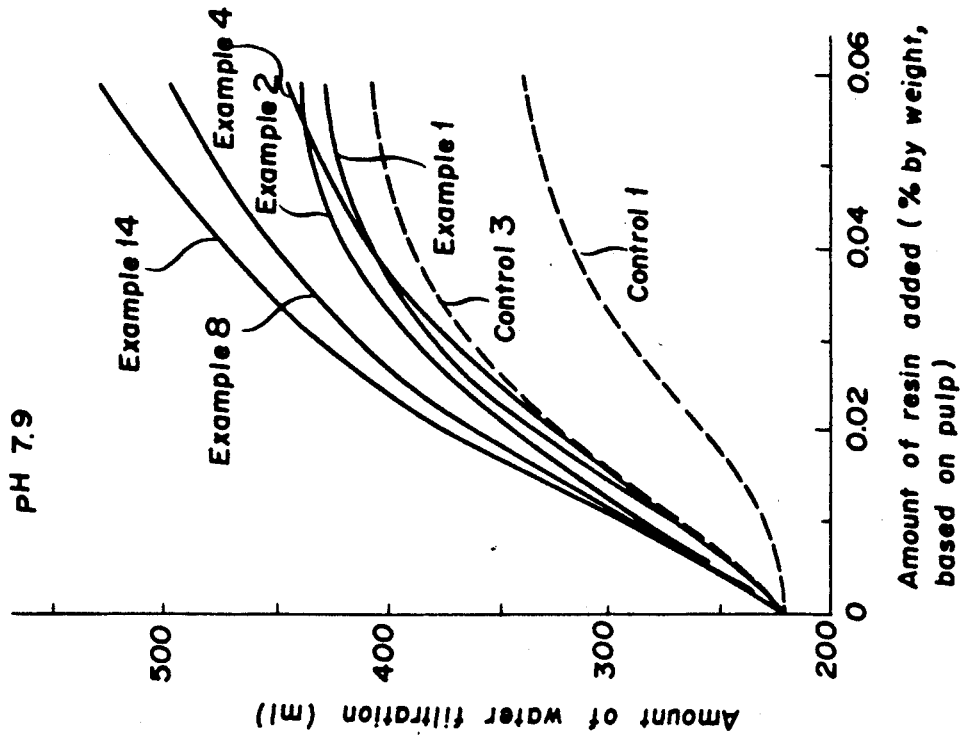
FIG. 1 is a graph showing the relation between the amount of a cationic water-soluble resin obtained by one method of this invention to be added to pulp and the amount water to be filtered.

The cationic water-soluble resins (1), (2), (4), (8), and (14) obtained respectively in Examples 1, 2, 4, 8, and 14 and the water-soluble resins (1) and (3) for comparison obtained respectively in Controls 1 and 3 were tested for the effect of an agent for enhancing the filtration of water during the molding of paper sheet in the papermaking industry. The conditions for the test were as shown below. The results of the test were as shown in FIG. 1.

Test conditions:

Paper for test: 0.5% solution of used corrugated cardboard paper

Method of test: The degree of water filtration was determined by adding a given cationic water-soluble resin or water-soluble resin for comparison to 1 liter of the paper solution and measuring the amount of water filtered by the use of a Canadian freeness tester.

Example 21

The cationic water-soluble resins (8), (9), (10), (14), (15), and (16) obtained respectively in Examples 8, 9, 10, 14, 15, and 16 and the water-soluble resins (1) and (3) for comparison obtained respectively in Controls 1 and 3 were tested for the effect for improving the yield of filler during the course of modling of paper sheet. The conditions for the test were as shown below. The results of the test were as shown in Table 5.

Test conditions:

Paper for test; LBKP

Filler: Calcium carbonte possessing an average particle diameter of 0.2 micron (product of Shiraishi Kogyo K.K.) (30% based on pulp) Procedure: 1% paper solution→filler→Sizing agent→aluminum sulfate→dilution→chemical agent→molding of paper sheet Ratio of yield: The ratio of yield of the filler was calculated from the ash content resulting from the heat treatment of the paper solution at 600° C. for 20 minutes.

TABLE 5

| Amount of resin added | Yield of calcium carbonate (%) (% based on pulp) | |
|---|---|---|
| Resin | 0.03 | 0.06 |
| Example 8 | 45.9 | 55.4 |
| 9 | 40.9 | 57.8 |
| 10 | 37.9 | 52.5 |
| 14 | 62.4 | 70.2 |
| 15 | 57.1 | 67.3 |
| 16 | 53.8 | 68.2 |
| Control 1 | 25.8 | 37.8 |
| 3 | 30.9 | 45.4 |
| None | 28.7 | |

Example 22

The cationic water-soluble resins (11), (12), (13), (17), (18), and (19) obtained respectively in Examples 11 to 13 and 17 to 19 were tested for the effect of an agent for enhancing the water filtration during the course of molding of paper sheet. The conditions for test are shown below. The results of the test were as shown in FIG. 2.

Test conditions:

Paper for test: 0.3% solution of used carboard paper

Method of test: The degree of water filtration was determined by adding a given cationic water-solution resin to 1 liter of the paper solution and measuring the amount of water filtration by the use of Canadian freeness tester.

Example 23

Figure 3:
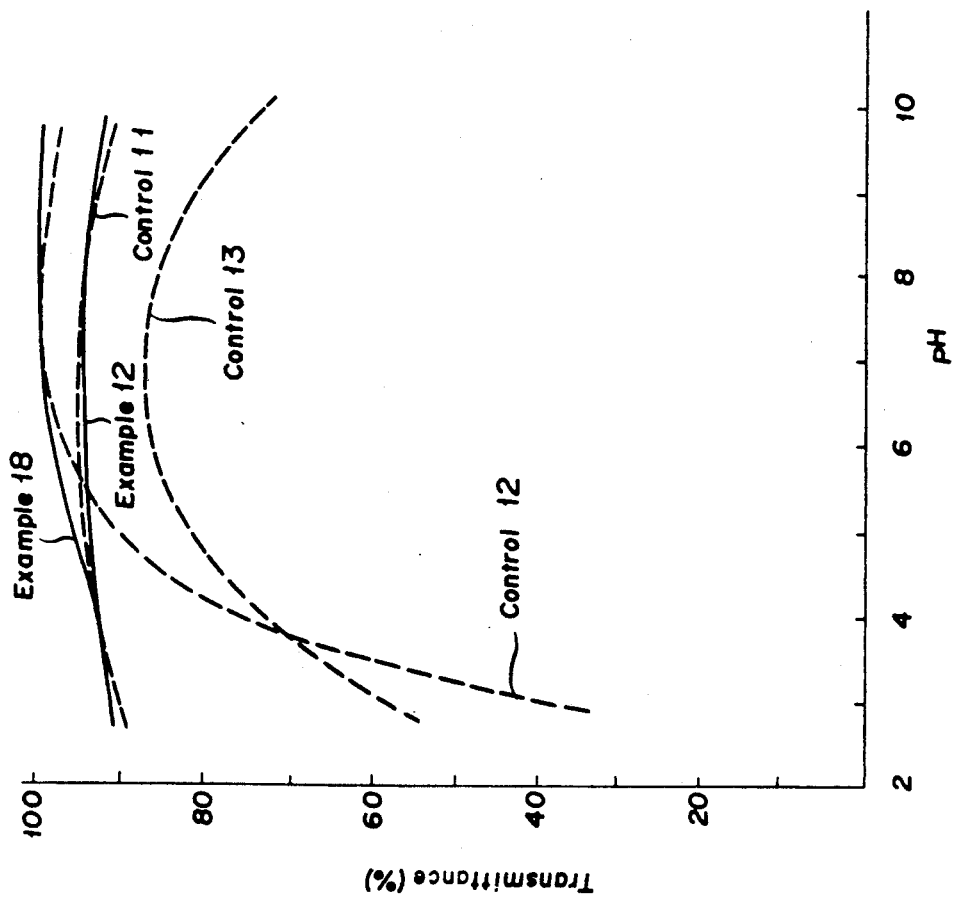
FIG. 3 is a graph showing the relation between the pH and the transmittance of the supernatant produced by adding to a cationic water dispersion of a cationic water-soluble resin obtained by the method of this invention.

The cationic water-soluble resins (12) and (18) obtained respectively in Examples 12 and 18 and the water-soluble resins (1), (3), (11), and (12) for comparison obtained respectively in Controls 1,3, 11, and 12 were tested for the effect of flocculation of aqueous dispersion of kaolin. This test was conducted by placing 100 ml of an aqueous dispersion of 3% by weight of pH-adjusted kaolin (confirming to the pertinent standard of the Japanese Pharma-copoeia) in a colorimetric tube, adding a given resin to the aqueous dispersion to a concentration of 10 ppm, overturning the tube ten times to stir the contents thereof, allowing the tube to stand at rest, and measuring the transmittance of the supernatant formed within the tube with a spectrometer ($\lambda=600$ nm). The results were as shown in FIG. 3. The resin of Control 1 showed no effect of flocculation. The transmittance of the supernatant was substantially 0%.

Example 24

The cationic water-soluble resins (3), (5), (6), and (7) obtained respectively in Examples 3, 5, 6, and 7 and the water-soluble resins (4), (5), (7), and (9) for comparison obtained respectively in Controls 4, 5, 7, and 9 were used as an agent for accelerating flocculation, dehydration, and filtration of activated sludge and tested for speed of filtration and water content of dehydrated cake to determine power of flocculation. The conditions for test are shown below.

Test conditions:

Activated sludge: SS, 4,800 ppm, pH 7.1

Method of evaluation: A mixture prepared by stirring 200 ml of activated sludge and a given resin at 100 rpm for 1 minute was passed through a filtr cloth under a vacuum of 200 mmHg. The speed of filtration was rated by the time required for the tiltrate to reach the total volume of 100 ml. The water content of the dehyrated cake was determined by drying the cake at 120° C. for 2 hours.

Figure 4:
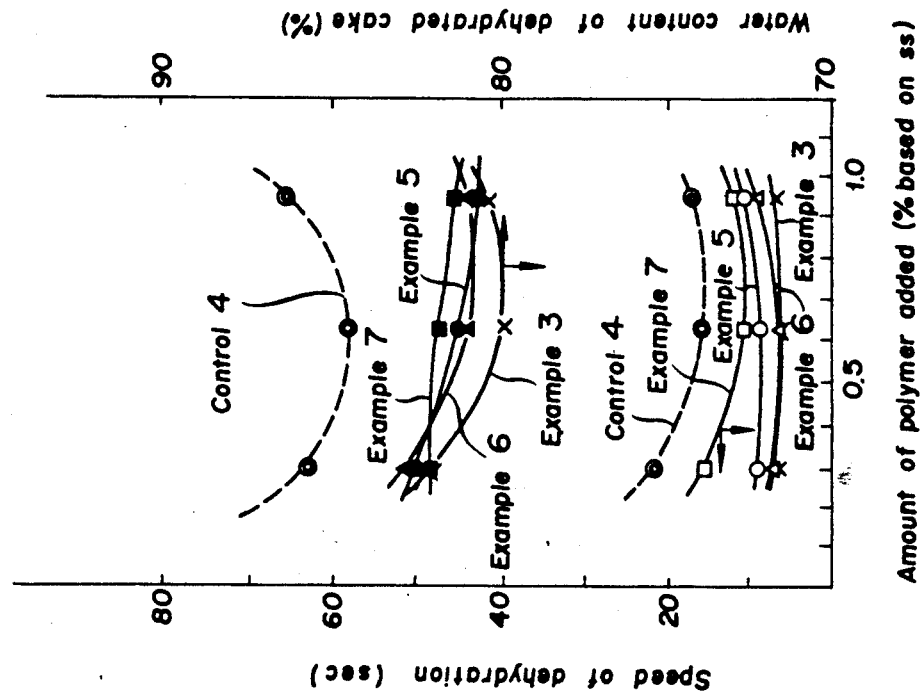
FIG. 4 is a graph showing the relation between the amount of the cationic water-soluble resin obtained by this invention and the speed of dehydration, and the relation between the amount of the cationic water-soluble resin and the water content of dehydration cake.

The results of the test were as shown in FIG. 4.

The water-treating agents made of the water-soluble resins (5), (7), and (9) for comparison showed poor effects of flocculation and were unable to effect dehydration of filtration.

INDUSTRIAL APPLICABILITY

By the method of this invention, a cationic water-soluble resin transformable into an aqueous solution of high resin concentration over a wide range of molecular weight can be quickly and safely produced by a simple procedure.

The cationic water-soluble resin (I) obtained by the first mode of the method permits adjustment of molecular weight over a wide range and, therefore, is useful as a water-treating agent such as flocculant over a wide range of pH value.

The cationic water-soluble resin (II) obtained by the second mode of the method enables an aqueous solution of a resin of particularly high molecular weight to be produced with a low viscosity exhibits the effect of a water-treating agent to a greater extent than the cationic water-soluble resin (I) over a wide range of pH value, and is useful as an agent for enhancing the water filtration and as an agent for treating plant effluent in the papermaking industry.

The cationic water-soluble resin (III) obtained by the third mode of the method is a product of enhanced cationic strength, is useful as a water-treating agent over a wide range of pH value, and manifests its effect conspicuously in the alkaline region.

The water-treating agent of this invention contains at least one member selected from the group consisting of the cationic water-soluble resins (I), (II), and (III) mentioned above. By suitably selecting specific members from this group and their proportions so as to meet the purpose for which the resin is intended, the product consequently obtained is useful for a water treatment of varying nature. It is used particulary advantageously as a water treating agent during the molding of paper sheet in the paper making industry and as a flocculant for the activated sludge for plant effluent and sewage.

We claim:

1. A method for the production of a cationic water-soluble resin, characterized by causing
   (A) 100 parts by weight of a polyethylene glycol polyhalohydrin ether obtained by the reaction of
      (a) 1 mol of polyethylene glycol with (b) 1 to 10 mols of an epihalohydrin to react with
   (B) 0.1 to 10,000 parts by weight of an aziridine compound.

2. A method according to claim 1, wherein (b) said epihalohyrin is used for the reaction with (a) said polyethylene glycol in an amount in the range of 2 to 5 mols per mol of (a) said polyethylene glycol.

3. A method according to claim 1, wherein (B) said aziridine compound is used for the reaction with (A) said polyethylene glycol polyhalohydrin ether in an amount in the range of 1 to 500 parts by weight per 100 parts by weight of (A) said polyethyelene glycol polyhalohydrin ether.

4. A method according to claim 1, wherein said reaction of (A) said polyethylene glycol polyhalohydrin ether with (B) said aziridine compound is carried out in an aqueous solution thereof adapted to contain the resultant cationic water-soluble resin in a final concentration in the range of 5 to 100% by weight at a temperature in the range of 0° to 200° C.

5. A method according to claim 1, wherein said reaction of (A) said polyethylene glycol polyhdalohydrin ether with (B) said aziridine compound is carried out in an aqueous solution thereof adapted to contain the resultant cationic water-soluble resin in a final concentration in the range of 20 to 70% by weight at a temperature in the range of 50° to 100° C.

6. A method according to claim 1, wherein (a) said polyethylene glycol has a molecular weight in the range of 200 to 100,000.

7. A method according to claim 1, wherein (b) said epihalohydrin is epichlorohydrin.

8. A method according to claim 1, wherein (B) said aziridine compound is an alkyleneimine.

9. A method according to claim 8, wherein said alkylene imine is ethylene imine.

10. A method for the production of a cationic water-soluble resin, characterized by causing
   (I) 100 parts by weight of a cationic water-soluble resin obtained by the reaction of (A) 100 parts by weight of a polyethylene glycol polyhalohydrin ether obtained by the reaction of (a) 1 mol of polyethylene glycol with (b) 1 to 10 mols of an epihalohydrin with
   (B) 0.1 to 10,000 parts by weight of an aziridine compound to react with 0.01 to 20 parts by weight of at least one member selected from the group consisting of (C) epihalohydrins and (D) water-soluble or water-dispersible polyfunctional epoxy compounds until the viscosity of an aqueous solution of a concentration of 20% by weight at 25° reaches a level in the range of 100 to 2,000 cps.

11. A method according to claim 10, wherein (b) said epihalohyrin is used for the reaction with (a) said polyethylene glycol in an amount in the range of 2 to 5 mols per mol of (a) said polyethylene glycol.

12. A method according to claim 10, wherein (B) said aziridine compound is used for the reaction with (A) said polyethylene glycol polyhalohydrin ether in an amount in the range of 1 to 500 parts by weight per 100 parts by weight of (A) said polyethyelene glycol polyhalohydrin ether.

13. A method according to claim 10, wherein said reaction of (A) said polyethylene glycol polyhalohydrin ether with (B) said aziridine compound is carried out in an aqueous solution thereof adapted to contain the resultant catnionic water-soluble resin in a final concentration in the range of 5 to 100% by weight at a temperature in the range of 0° to 200° C.

14. A method according to claim 10, wherein said reaction of (A) said polyethylene glycol polyhalohydrin ether with (B) said aziridine compound is carried out in an aqueous solution thereof adapted to contain the resulant cationic water-soluble resin in a final concentration in the range of 20 to 70% by weight at a temperature in the range of 50° to 100° C.

15. A method according to claim 10, wherein said at least one member selected from the group consisting of (C) epihalohydrins and (D) water-soluble or water-dispersible polyfunctional epoxy compounds is used for the reaction with (I) said cationic water-soluble resin in an amount in the range of 0.1 to 10 parts by weight per 100 parts by weight of (I) said cationic soluble resin.

16. A method according to claim 10, wherein (D) said water-soluble or water-dispersible polyfunctional epoxy compound is used for the reaction with (I) said cationic water-soluble resin in an amount in the range of 0.1 to 10 parts by weight per 100 parts by weight of (I) said cationic water-soluble resin.

17. A method according to claim 10, wherein the reaction of (I) said cationic water-soluble resin with (C) said epihalohydrin and (D) said water-soluble or water-dispersible polyfunctional epoxy compound is carried out in an aqueous solution thereof adapted to contain the resultant cationic water-soluble resin in a concentration in the range of 10 to 30% by weight at a temperature in the range of 0° to 80° C.

18. A method according to claim 10, wherein (a) said polyethylene glycol has a molecular weight in the range of 200 to 100,000.

19. A method according to claim 10, wherein (C) said epihalohydrin is epichlorohydrin.

20. A method according to claim 10, wherein (B) said aziridine compound is an alkyleneimine.

21. A method according to claim 20, wherein said alkyleneimine is ethyleneimine.

22. A method according to claim 20, wherein (C) said epihalohydrin is epichlorohydrin.

23. A method according to claim 10, wherein (D) said water-soluble or water-dispersible polyfunctional epoxy compound is a compound represented by the following formula (1):

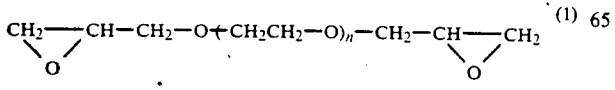

(1)

wherein n is an integer of 1 to 30.

24. A cationic water-soluble resin, produced by causing (I) 100 parts by weight of a cationic water-soluble resin obtained by the reaction of (A) 100 parts by weight of a polyethylene glycol polyhalohydrin ether obtained by the reaction of (a) 1 mol of polyethylene glycol with (b) 1 to 10 mols of an epihalohydrin with (B) 0.1 to 10,000 parts by weight of an aziridine compound to react with 0.01 to 20 parts by weight of at least one member selected from the group consisting of (C) epihalohydrins and (D) water-soluble or water-dispersible polyfunctional epoxy compounds.

25. A method for the production of a cationic water-soluble resin, characterized by causing 100 parts by weight of a polycation component composed of (I) 99 to 1% by weight of a cationic water-soluble resin obtained by the reaction of (A) 100 parts by weight of a polyethylene glycol polyhalohydrin ether obtained by the reaction of (a) 1 mol of polyethylene glycol with (b) 1 to 10 mols of an epihalohydrin with (B) 0.1 to 10,000 parts by weight of an aziridine compound and (E) 1 to 99% by weight of a polyalkyleneimine to react with 0.01 to 20 parts by weight of (F) epihalohydrins and (G) water-soluble or water-dispersible polyfunctional epoxy compounds until the viscosity of an aqueous solution of a concentration of 20% by weight at 25° C. reaches a level in the range of 100 to 2,000 spc.

26. A method according to claim 25, wherein (b) said epihalohydrin is used for the reaction with (a) said polyethylene glycol in an amount in the range of 2 to 5 mols per mol of (a) said polyethyelene glycol.

27. A method according to claim 25, wherein (B) said aziridine compound is used for the reaction with (A) said polyethylene glycol polyhalohydrin ether in an amount in the range of 1 to 500 parts by weight per 100 parts by weight of (A) said polyethylene glycol polyhalohydrin ether.

28. A method according to claim 25, wherein said reaction of (A) said polyethylene glycol polyhalohydrin ether with (B) said aziridine compound is carried out in an aqueous solution thereof adapted to contain the resultant cationic water-soluble resin in a final concentration in the range of 5 to 100% by weight at a temperature in the range of 0° to 200° C.

29. A method according to claim 25, wherein said reaction of (A) said polyethylene glycol polyhalohydrin ether with (B) said aziridine compound is carried out in an aqueous solution thereof adapted to contain the resultant cationic water-soluble resin in a final concentration in the range of 20 to 70% by weight at temperature in the range of 50° to 100° C.

30. A method according to claim 25, wherein said polycation component is composed of (I) 95 to 30% by weight of said cationic water-soluble resin and 5 to 70% by weight of said polyalklyleneimine.

31. A method according to claim 25, wherein said at least one member selected from the group consisting of (F) said epihalohydrins and (G) said water-soluble or water-dispersible polyfunctional epoxy compounds is used for the reaction with said polycation component in an amount in the range of 0.1 to 10 parts by weight per 100 parts by weight of said polycation component.

32. A method according to claim 25, wherein (G) said water-soluble or water-dispersible polyfunctional epoxy compound is used for the reaction with said polycation component in an amount in the range of 0.1 to 10 parts by weight per 100 parts by weight of said polycation component.

33. A method according to claim 25, wherein said reaction of said polycation component with at least one member selected from the group consisting of (F) said epihalohydrins and (G) said water-soluble or water-dispersible polyfunctional epoxy compounds is carried out in an aqueous solution thereof adapted to contain the resultant cationic water-soluble resin in a concentration in the range of 10 to 30% by weight at a temperature in the range of 0° to 80° C.

34. A method according to claim 25, wherein (a) said polyethylene glycol has a molecular weight in the range of 200 to 100,000.

35. A method according to claim 25, wherein (b) said epihalohydrin is epichlorohydrin.

36. A method according to claim 25, wherein (B) said aziridine compound is an alkyleneimine.

37. A method according to claim 36, wherein said alkyleneimine is ethyleneimine.

38. A method according to claim 36, wherein (F) said epihalohydrin is epichlorohydrin.

39. A method according to claim 25, wherein (G) said water-soluble or water-dispersible polyfunctional epoxy compound is a compound represented by the following formula (1):

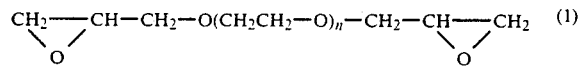

wherein n is an integer of 1 to 30.

40. A method according to claim 25, wherein (E) said polyalkyleneimine is polyethyleneimine.

41. A cationic water-soluble resin, produced by causing 100 parts by weight of a polycation component composed of (I) 99 to 1% by weight of a cationic water-soluble resin obtained by the reaction of (A) 100 parts by weight of a polyethylene glycol polyhalohydrin ether obtained by the reaction of (a) 1 mol of polyethylene glycol with (b) 1 to 10 mols of an epihalohydrin with (B) 0.1 to 10,000 parts by weight of an aziridine compound and (E) 1 to 99% by weight of a polyalkyleneimine to react with 0.01 to 20 parts by weight of at least one member selected from the group consisting of (F) epihalohydrins and (G) water-soluble or water-dispersible polyfunctional epoxy compounds.

42. A water-treating agent comprising at least one cationic resin selected from the group consisting of
(I) a cationic water-soluble resin produced by the reaction of (A) 100 parts by weight of a polyethylene glycol polyhalohydrin ether obtained by the reaction of (a) 1 mol of polyethylene glycol with (b) 1 to 10 mols of an epihalohydrin with (B) 0.1 to 10,000 parts by weight of an aziridine compound,
(II) a cationic water-soluble resin produced by causing (I) said cationic water-soluble resin to react with 0.01 to 20 parts by weight of at least one member selected from the group consisting of (C) epihalohydrins and (D) water-soluble or water-dispersible polyfunctional epoxy compounds until the viscosity of an aqueous solution thereof of concentration of 20% by weight at 25° C. reaches a level in the range of 100 to 2,000 cps, and
(III) a cationic water-soluble resin produced by causing 100 parts by weight of a polycation component composed of (I) 99 to 1% by weight of said cationic water-soluble resin and (E) 1 to 99% by weight of a polyalkyleneimine to react with 0.01 to 20 parts by weight of at least one member selected from the group consisting of (F) epihalohydrins and (G) water-dispersible polyfunctional epoxy compounds until the viscosity of an aqueous solution of a concentration of 20% by weight at 25° C. reaches a level in the range of 100 to 2,00 cps.

43. A water-treating agent according to claim 42, wherein (b) said epihalohydrin is used for the reaction with (a) said polyethylene glycol in an amount in the range of 2 to 5 mols per mol of (a) said polyethylene glycol.

44. A water-treating agent according to claim 42, wherein said (B) aziridine compound is used for the reaction with (A) said polyethylene glycol polyhalohydrin ether in an amount in the range of 1 to 500 parts by weight per 100 parts by weight of (A) said polyethylene glycol polyhalohydrin ether.

45. A water-treating agent according to claim 42, wherein said reaction of (A) said polyethylene glycol polyhalohydrin ether with (B) said aziridine compound is carried out in an aqueous solution thereof adapted to contain the resultant cationic water-soluble resin in a final concentration in the range of 5 to 100% by weight at a temperature in the range of 0° to 200° C.

46. A water-treating agent according to claim 42, wherein said reaction of (A) said polyethylene glycol polyhalohydrin ether with (B) said aziridine compound is carried out in an aqueous solution therein adapted to contain the resultant cationic water-soluble resin in a final concentration in the range of 20 to 70% by weight at a temperature in the range of 50° to 100° C.

47. A water-treating agent according to claim 42, wherein (II) said cationic water-soluble resin is produced by causing 0.1 to 10 parts by weight of at least one member selected from the group consisting of (C) epihalohydrins and (D) water-soluble or water-dispersible polyfunctional epoxy compounds to react with (I) 100 parts by weight of said cationic water-soluble resin.

48. A water-treating agent according to claim 42, wherein (II) said cationic water-soluble resin is produced by causing 0.1 to 10 parts by weight of (D) a water-soluble or water-dispersible polyfunctional epoxy compound to react with (I) 100 parts by weight of said cationic water-soluble resin.

49. A water-treating agent according to claim 42, wherein (II) said cationic water-soluble resin is produced by causing (I) said cationic water-soluble resin to react with at least one member selected from the group consisting of (C) epihalohydrins and (D) water-soluble or water-dispersible polyfunctional epoxy compounds in an aqueous solution thereof adapted to contain the resultant cationic water-soluble resin (I) in a concentration in the range of 10 to 30% by weight at a temperature in the range of 0° to 80° C.

50. A water-treating agent according to claim 42, wherein said polycation component is composed of 95 to 30% by weight of a cationic water-soluble resin and 5 to 70% by weight of a polyalkyleneimine.

51. A water-treating agent according to claim 42, wherein (III) said polycationic water-soluble resin is produced by causing 100 parts by weight of a polycation component to react with 0.1 to 10 parts by weight of at least one member selected from the group consisting of (F) epihalohydrins and (G) water-soluble or water-dispersible polyfunctional epoxy compounds.

52. A water-treating agent according to claim 42, wherein (III) said cationic water-soluble resin is produced by causing 100 parts by weight of a polycation component to react with 0.1 to 10 parts by weight of (G) a water-soluble or water-dispersible polyfunctional epoxy compound.

53. A water-treating agent according to claim 42, wherein (III) said cationic water-soluble resin is produced by causing a polycation component to react with at least one member selected from the group consisting of (F) epihalohydrins and (G) water-soluble or water-dispersible polyfunctional epoxy compounds in an aqueous solution therein adapted to contain the resultant cationic water-soluble resin (I) in a concentration in the range of 10 to 30% by weight at a temperature in the range of 0° to 80° C.

54. A water-treating agent according to claim 42, wherein (a) said polyethylene glycol has a molecular weight in the range of 200 to 100,000.

55. A water treating agent according to claim 42, wherein (C) said epihalohydrin is epichlorohydrin.

56. A water-treating agent according to claim 42, wherein (B) said aziridine compound is an alkyleneimine.

57. A water-treating agent according to claim 56, wherein said alkyleneimine is ethyleneimine.

58. A water-treating agent according to claim 56, wherein (E) said epihalohydrin is epichlorohydrin.

59. A water treating agent according to claim 42, wherein (D) said water-soluble or water-dispersible polyfunctional epoxy compound is a compound represented by the following formula (1):

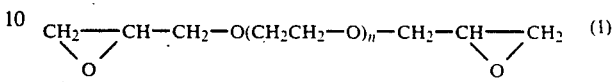

wherein n is an integer of 1 to 30.

60. A water-treating agent according to claim 42, wherein (E) said polyalkyleneimine is polyethyleneimine.

61. A water-treating agent according to claim 42, comprising at least either of (II) said cationic water-soluble resin or (III) said cationic water-soluble resin.

62. A water-treating agent according to claim 42, comprising (III) said cationic water-soluble resin.

* * * * *